United States Patent [19]

Frey et al.

[11] Patent Number: 5,253,288
[45] Date of Patent: Oct. 12, 1993

[54] ALTERNATE DESTINATION CALL REDIRECTION FOR TELECOMMUNICATIONS SYSTEMS

[75] Inventors: Alan E. Frey, Naperville, Ill.; Joshua H. Rosenbluth, Middletown, N.J.; Susan J. Sobel, Brooklyn, N.Y.

[73] Assignee: AT&T Bell Laboratories, Murray Hill, N.J.

[21] Appl. No.: 763,489

[22] Filed: Sep. 23, 1991

Related U.S. Application Data

[63] Continuation of Ser. No. 500,649, Mar. 28, 1990, abandoned.

[51] Int. Cl.$^5$ .............................................. H04M 3/42
[52] U.S. Cl. .................................. 379/221; 379/201; 379/210; 379/265
[58] Field of Search ............... 379/220, 221, 222, 265, 379/266, 279, 261, 210

[56] References Cited

U.S. PATENT DOCUMENTS

| | | | |
|---|---|---|---|
| 4,191,860 | 3/1980 | Weber | 179/18 B |
| 4,400,587 | 8/1983 | Taylor et al. | 379/221 X |
| 4,723,272 | 4/1985 | Maat | 379/211 |
| 4,757,267 | 7/1988 | Ristin | 379/201 X |
| 4,800,583 | 1/1989 | Theis | 379/211 |
| 4,866,763 | 9/1989 | Cooper et al. | 379/221 |

OTHER PUBLICATIONS

Telephony Magazine, May 7, 1979, pp. 43–46, Article "CCIS: Signaling the future of stored program control" by Ebner & Tomko.
Inbound/Outbound Magazine, Nov. 1989, "Disaster Prevention" by Mike Bush, p. 54.
Communication & Transmission, No. 4, 1986, entitled "The Freephone Service:Operating Result, . . . " pp. 91–102.
AT&T TR 41459, Technical Reference, "AT&T Integrated Services Digital Network (ISDN) Primary Rate Interface and Special Application Specification", (User—Network Interface Description, Jul. 1989.
Appendix 4, Update to the Technical Reference 41459 (Jul. 1989), Dec. 15, 1989.
H. K. Woodland et al., "System 75: System Management", AT&T Technical Journal, vol. 64, No. 1, Jan. 1985, pp. 213–228.
"Pinnacle TM Automatic Call Distributor", AT&T Network Systems brochure, 1991, 12 pages and 2 inserts.

Primary Examiner—James L. Dwyer
Assistant Examiner—Ahmad F. Matar
Attorney, Agent, or Firm—Werner Ulrich

[57] ABSTRACT

This invention relates to apparatus and methods for redirecting calls from a first choice destination to some alternate destination if the call cannot be conveniently completed to the first destination. A call is initially extended through a toll network toward the first destination; if the toll network is congested and cannot reach an egress switch to access the first destination, or if a local exchange network connecting the first destination to the toll network is congested, or if a first destination PBX cannot be reached from the toll or local network because all access channels thereto are blocked, or if the first destination PBX is congested or attendants are unavailable, an indication that the call cannot be completed to the first destination is sent back to the ingress switch to the toll network for that call. The call is then redirected from the ingress switch of the toll network to an alternate destination. In some cases, this alternate destination may be the same as the first destination but accessed from a different egress switch of the toll network. Advantageously, this arrangement allows calls to be completed to an alternate destination regardless of the reason why the call cannot be completed to the first choice destination. If the first choice destination is a program-controlled PBX, the PBX can be programmed to reject certain types of calls according to the traffic load being handled by the PBX and the particular staffing available at a certain time. Thus, for example, the PBX could be arranged to accept calls for new orders but to redirect calls requesting information about shipments if the staffing of the first choice destination is relatively low. The reason for rejection can be used for altering the choice of an alternate destination or for canceling a potential redirection.

22 Claims, 3 Drawing Sheets

ALTERNATE DESTINATION CALL REDIRECTION FOR TELECOMMUNICATIONS SYSTEMS

This application is a continuation of application Ser. No. 500,649, filed on Mar. 28, 1990 now abandoned.

TECHNICAL FIELD

This invention relates to arrangements for redirecting telecommunications calls when a primary destination is unavailable or inaccessible.

PROBLEM

A large total volume of telecommunications traffic is directed to large business customers who have geographically diverse facilities for handling the same general type of call. For example, an airline may have private branch exchanges (PBXs) for accepting reservations in a number of cities. In such situations, it is economically important for the business customer to be able to use these facilities efficiently by ensuring that customers may reach alternate facilities even if a particular preferred PBX facility is unavailable through being busy or because of congestion in the telecommunications network between the caller and the preferred facility. The term PBX as used herein includes automatic call distributor (ACD) arrangements controlled at the customer's premises or at a local switch connected thereto, and includes central office controlled arrangements such as Centrex. The PBX may be accessed directly from a toll switch or may be accessed via a local switch.

In one presently available arrangement, a database is accessed in order to decide which PBX facility of a particular business customer is to receive a particular call. This database allocates calls on a percentage basis to the different automatic call distributors. A disadvantage of this arrangement is that the different facilities may experience different holding times for their calls at any particular time so that even if a fair allocation of the traffic is made, some of these facilities may be temporarily overloaded and others temporarily underloaded.

In another arrangement, the database maintains a record of the number of active calls which have been directed to each of the automatic call distributors. If the primary choice PBX for any particular call is overloaded, then the call is routed to an alternate PBX. In this arrangement, the database maintains a record of the amount of traffic routed to each PBX in order to detect overloads. Customers can be automatically routed to other teams of agents if no agents are available at the preferred PBX but if the other teams are also busy, the call is queued at the preferred PBX.

In another arrangement, if a particular PBX is overloaded it will still accept the call but reroute it via dedicated private facilities to an alternate PBX.

All of these schemes have a number of limitations. A problem with any arrangement wherein a database maintains a record of calls to the various ACDs is that congestion in the toll network or failure in the toll network cannot be readily detected so and calls continue to be routed to a PBX even through these calls are likely to be blocked as a result of the network congestion. Further, the database maintains a fixed maximum number of calls that can be accepted by each PBX, although this number is changeable by a traffic administration; if the PBX is connected to the toll network by facilities shared with other kinds of traffic, for example, outgoing traffic, this number, in fact, changes dynamically. The arrangement wherein calls are redirected over private facilities to an alternate PBX is costly since all or part of these private facilities are usually provided only for this purpose; furthermore, the total number of call completions is limited by the access facilities of the primary PBX.

Accordingly, a problem of the prior art is that there is no economically satisfactory solution to the problem of distributing traffic among a plurality of PBX facilities of a multilocation or multi-entity customer which is both capable of routing traffic to any PBX having an available server or a sufficiently small queue for such a server, and capable of responding immediately to network congestion or failure conditions, or customer premises disruptions, or traffic surges which exceed the capabilities of a shared access arrangement to serve offered traffic.

SOLUTION

In accordance with the principles of this invention, an advance is made over the prior art in a method and apparatus arrangement wherein calls are initially directed to a preferred choice destination and, if the call cannot be completed satisfactorily to that destination for any reason, the call is redirected to a prespecified alternate destination. Among the reasons why the call may not be completed are: congestion in the toll network required to access the preferred choice or other destinations; unavailability of access facilities between the toll network and the destination; and failure of the toll egress switch for accessing the destination. For the special case of customers having PBX facilities capable of sending message signals to the toll network, these reasons are further expanded to include a busy message from the destination or a message from the PBX requesting redirection because of internal overload or any other reason. Advantageously, such an arrangement permits the toll network to allocate traffic dynamically in response to all of the above-named conditions.

The destination may be a PBX, a central office controlled ACD, a multi-line hunting group or a single line.

In one specific implementation, this kind of messaging capability is provided through the facilities of an Integrated Services Digital Network (ISDN) capability between the switch serving the PBX and the PBX.

In accordance with one feature of this invention in one specific embodiment of the invention, one or more databases shared by a toll network provides an identification of the preferred choice PBX. This identification is normally in the form of a switch identification, trunk group identification, and a specific identification of the customer premises equipment. In accordance with one specific implementation, this number is transmitted to an ingress toll switch in the form of a non-existent switch number that is used for accessing a translation table which provides both the identification of the real switch and the trunk number for accessing the preferred destination PBX. Advantageously, a non-existent switch number is a convenient signal that the features of this invention are being invoked for this call.

In accordance with one aspect of the invention, a customer PBX responds to an incoming call request by either accepting the call request or rejecting it with a call reject message. This call reject message or a corresponding message triggered thereby is subsequently transported back to the ingress toll switch and used as an indication to redirect the call. Advantageously, the intelligence of the customer premises equipment can be used to make an immediate decision based on current traffic at that PBX and current availability of agents at that PBX to determine whether to accept the call or to cause the call to be rerouted to another PBX. In accordance with one aspect of this feature, the PBX may send a call redirection message redirecting the call to a voice message operations center for storing a voice message from the caller. This feature can also be used in the following way. Calls to different telephone numbers may for the purposes of administration be routed in the same way to the same groups of PBXs. However, these calls may represent different priority types of business, for example, they may represent complaints or new orders. Clearly, new order traffic is more important to the business customer than complaint traffic; the PBX may therefore set a different threshold for rejecting complaint calls than for rejecting new order calls. This can be done by sending out a redirect message for a high priority call and a reject message for a low priority call.

The call redirection discussed herein is for redirecting calls at or prior to the time that the PBX receives an incoming call message. In response to the incoming call message, the PBX accepts the call either by placing it in a queue or by immediately connecting it to an agent or rejects the call with or without a request that the call be redirected to an alternate PBX.

In another application of this feature, the alternate destination and the first choice destination are the same. However, the alternate destination is accessed using a different path through the toll network and preferably using a different egress toll switch. The two paths and toll egress switches are selected as a result of different translations at the database and toll ingress switch. Advantageously, with such an arrangement, calls can be completed to a particular PBX even if the primary egress switch for serving that PBX is out of service.

DETAILED DESCRIPTION

Figure 1:
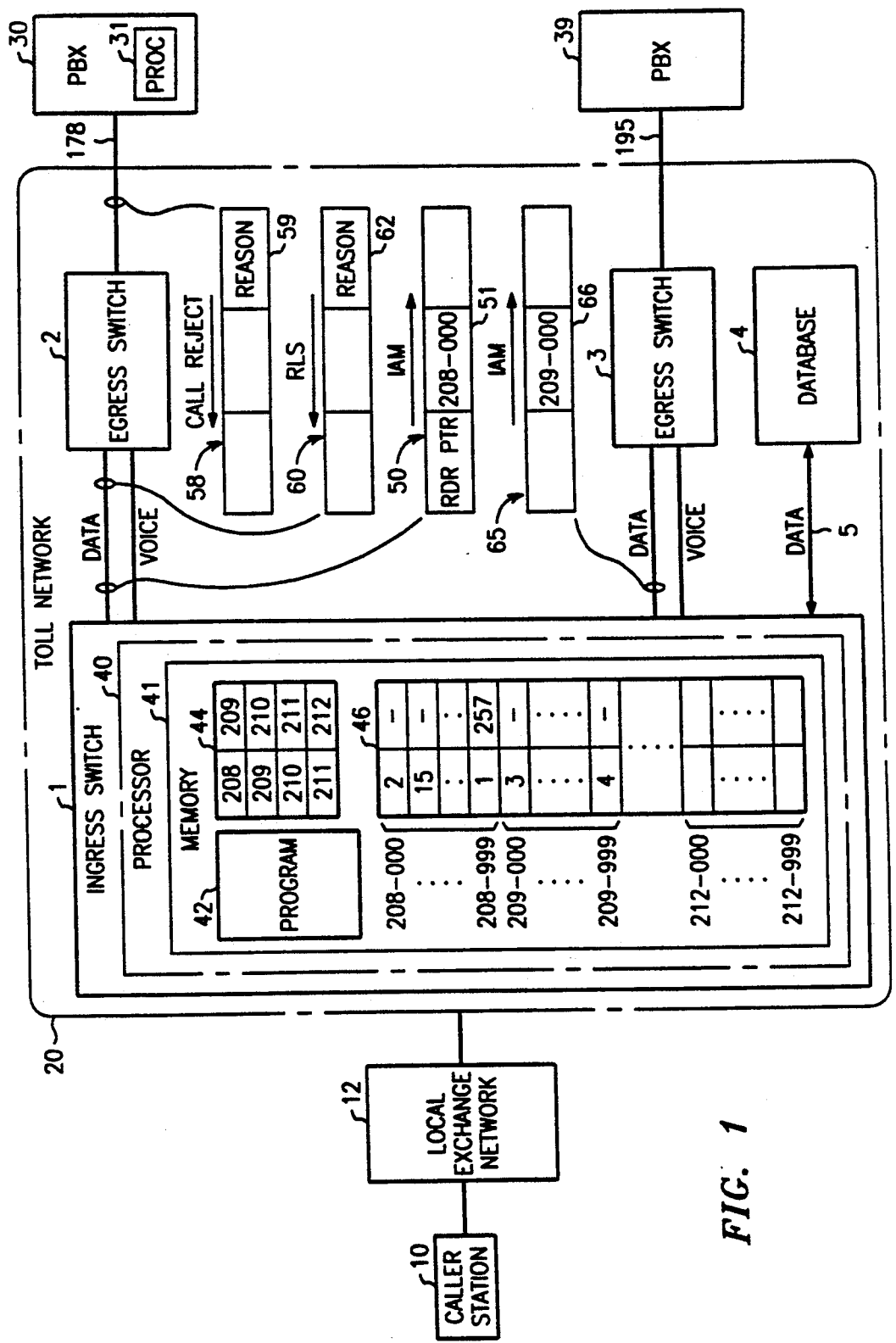
FIG. 1 is a block diagram illustrating how calls are directed and redirected in accordance with the principles of this invention.

FIG. 1 is a block diagram of an example network illustrating how calls may be redirected in accordance with the principles of this invention. A caller station 10 originates a call which can be served from PBX 30 or PBX 39, both associated with the same business. PBX 30 and PBX 39 might be, for example, two PBXs for serving reservation requests for one airline. PBX 30 and PBX 39 are in different cities and are served by different switches of a toll network 20. The caller station accesses toll network 20 via local exchange network 12 which is connected to switch 1 of toll network 20. For the purposes of this call, switch 1 is an ingress switch to the toll network and switches 2 and 3 connected respectively to PBXs 30 and 39 are egress switches of the network. While only three switches of the network are shown, a typical real toll network may contain many more switches and the connections between ingress switch 1 and egress switch 2 or egress switch 3 may be via one or more intermediate toll switches. In addition, toll network 20 includes a database 4 which is used for obtaining data about certain classes of dialed destinations.

In this specific example, the telephone number dialed to be connected to an agent of the airline is an 800 number using the initial digits 800 instead of a conventional numbering plan area (NPA) code. Calls to 800 numbers are not restricted to the area served by any one NPA. The principles of routing 800 calls under the control of a database are disclosed in R. P. Weber, U.S. Pat. No. 4,191,860. All the toll switches are operative under the control of processor means controlled by a program. Processor 40, including memory 41 which stores among other items a program 42, is the processor means for controlling ingress switch 1. Egress switches 2 and 3 have similar processors. When ingress switch 1 receives a call destined for the airline served by PBX 30 or PBX 39, it first accesses database 4 to obtain the data necessary to route the call to its destination. Ingress switch 1 accesses database 4 via data link 5 with the 800 number dialed from caller station 10. Database 4 responds over data link 5 with a ten-digit number comprising a switch identification (SSS), a trunk group identification within the switch (TTT) and a further specific identification of the destination (XXX). In accordance with the specific embodiment of the invention, for a customer who wishes that calls which cannot be completed to a preferred one of that customer's PBXs be redirected to a second of that customer's PBXs, this information from the database contains a number of a non-existent switch instead of the conventional SSS switch number. In this case SSS-TTT=208-000. When ingress switch 1 detects that the data returned by the database includes the number of a non-existent switch, processor 40 of ingress switch 1 access table 46 using the returned non-existent switch number and the returned TTT number to obtain the real number of the switch which is connected to the preferred choice PBX, in this case, PBX 30. The translation therefore is from the non-existent switch number to the number 002 which identifies egress switch 2 connected to the preferred PBX 30. Ingress switch 1 sends an initial address message 50 comprising the non-existent switch number as well as the TTT and XXXX number 51 obtained from the database 4 and routes the call toward egress switch 2, the switch identified in the translation of table 46. The call is routed to egress switch 2 which translates the incoming address message in its own version of table 46 and discovers that the identification of the switch for SSS-TTT equals 208-000 is its own switch number. Switch 2 obtains in its own translation table the number of the trunk group 178 to be used for accessing the desired destination, in this case PBX 30.

If the call has not been successfully extended to egress switch 2, a release message for the call is sent from the point at which the extension was not successful. If egress switch 2 detects an all circuits busy connection for circuits to PBX 30, egress switch 2 will send a release message. If PBX 30 is a program controlled system comprising a processor 31 and message generating capabilities, and wishes to reject the call, it will send a call rejection message 58 comprising a reason for rejection segment 59 back to egress switch 2. In response to receiving such a rejection message, egress switch 2 will send back to ingress switch 1 a release message 60 comprising a reason for release indicator 62. If release messages have been generated for any of the reasons discussed above and transmitted to ingress switch 1, whatever portion of the connection from ingress switch 1 toward PBX 30 has been established, is released and ingress switch 1 consults table 44 to determine an alternate non-existent switch code corresponding to switch code 208. In this case the alternate non-existent switch code is 209. The entry in table 46 of processor 40 of ingress switch 1 corresponding to 209-000 (000 is the TTT number originally provided by database 4) is 3. Therefore, a second initial address message 65 containing the number 209-000 (segment 66) is transmitted to egress switch 3, switch 3 having been the switch identified in the above-noted access of table 46. Switch 3 translates 209-000 to 3-195, thus discovering that the call is destined for itself, trunk group 195. Thereafter, if PBX 39 is able to accept the call, the call is extended from ingress switch 1 via egress switch 3 to PBX 39.

The specific reason for the release may be used to modify the redirection. For example, if the redirection is to the same destination via another egress switch, no redirection is performed if the reason is that the called subscriber is busy.

In this specific embodiment, table 44 is used to advance from one non-existent switch number to the next. Alternatively, a programmed algorithm for performing this advance (such as incrementing by 1 but limited to some specified parameter, such as 212 to be comparable to the table 44 prescription) could also be used. If, in a particular situation, the number of alternate PBX destinations is finite then the attempt to advance beyond the last alternate PBX is signaled by having a translation in table 46 which indicates a non-existent switch number as a signal that there are no more PBXs to which calls can be redirected. Further, while in this example the egress switch is directly connected to the PBX, it can be connected to the PBX via a local exchange network provided that the local exchange network has a satisfactory method of signaling to the egress switch that the call cannot be satisfactorily completed to the selected destination. Note that the destination need not be a PBX, but could be a single line customer, or any other destination.

There are, of course, many other alternative data layouts which can be used to accomplish the fundamental objectives of allowing for the recognition of a call which may be redirected from one destination to another; allowing for the termination of attempts to redirect the call; providing an indication to a selected egress switch that the call is to be connected to a destination connected to that egress switch, and identifying the proper trunk group for accessing the PBX. For example, table 46 can be arranged to supply the primary and alternate switch numbers and to use the table 44 to advance from one non-existent switch number to the next or to provide the primary switch number and an alternate non-existent switch number and TTT number which latter could then be used for accessing table 46 to find the next alternative switch and next alternative non-existent switch number and TTT number. Further, a separate table could be used for identifying TTT numbers associated with a switch acting as an egress switch.

Figure 2:
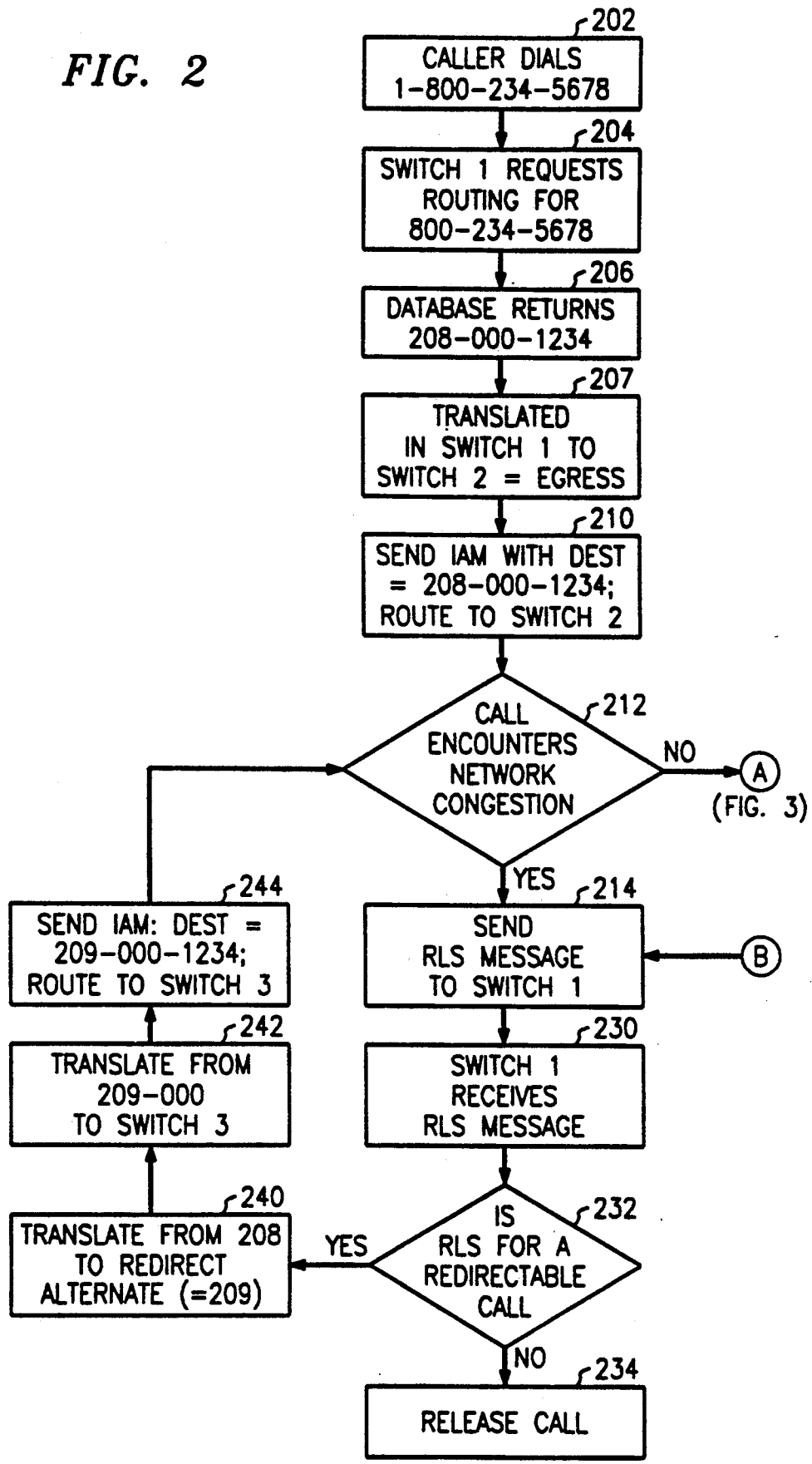
FIGS. 2 and 3 are flow diagrams of a method for performing redirection of calls.

FIG. 2 is a flow diagram of actions performed to implement automatic redirection in accordance with the principles of this invention. The flow diagram illustrates a specific example of a call but it will be apparent from the example what actions are performed by the program in a general case.

Figure 3:
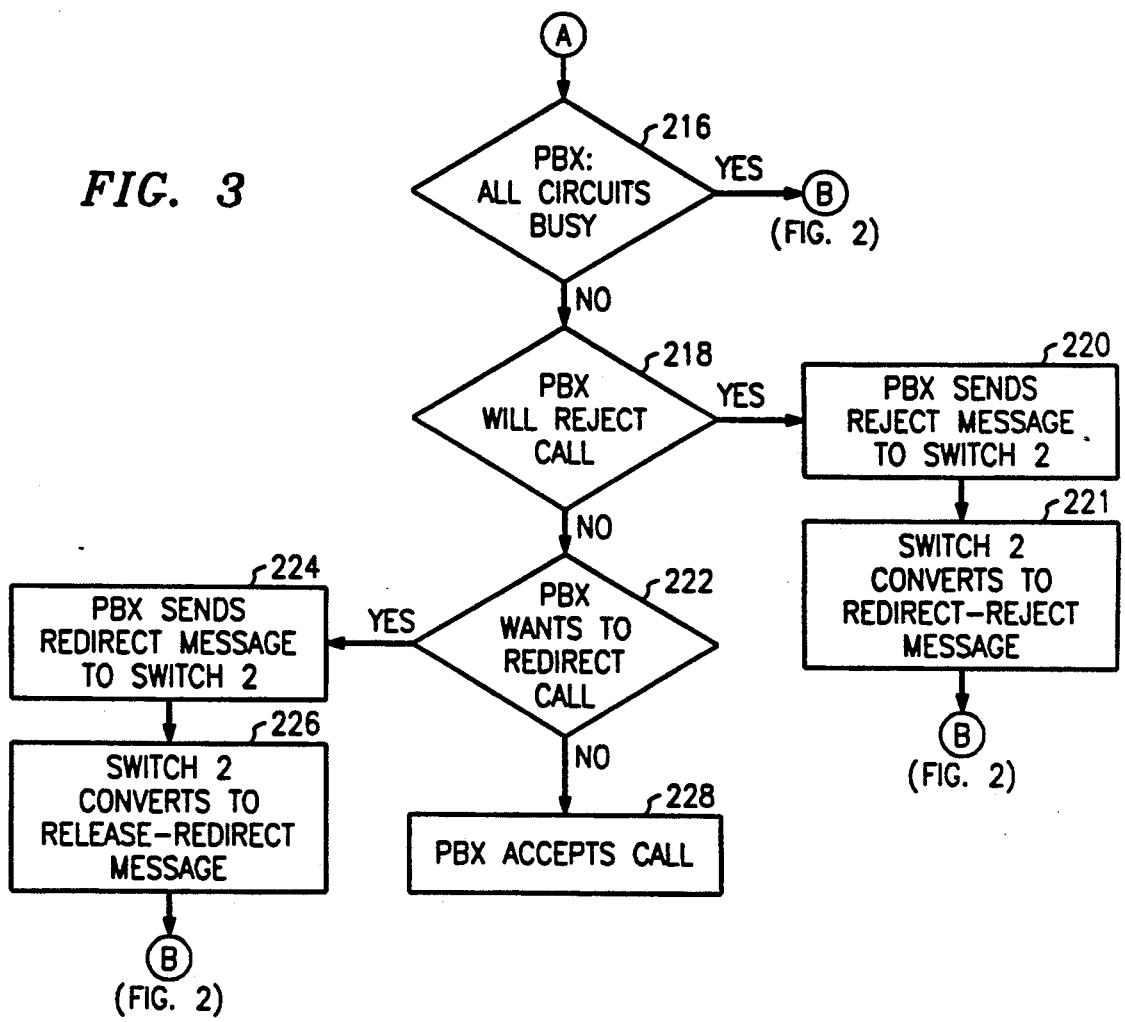

Suppose that the caller dials an 800 number, in this case 1-800-234-5678 (action block 202) The caller is connected via local exchange network 12 to switch 1. Switch 1 requests routing from database 4 for the called number 1-800-234-5678 (action block 204). Database 4 returns to ingress switch 1 a number of the format SSSTTTXXXX wherein SSS specifies a switch number, TTT a trunk group within that switch, and XXXX a specific identification of the called destination. In this case, database 4 returns the number 208-000-1234 (action block 206). 208 is an identification of a non-existent switch (the AT&T network contains fewer than 150 toll switches). The number 208-000 is used by ingress switch 1 to access memory table 46 which has a record corresponding to the 208-000 accessing number that indicates that the preferred destination egress switch is switch 2 (action block 207). Switch 1 then sends an initial address message with the destination field containing the number 208-000-1234 and routes the call to egress switch 2 (action block 210). Egress switch 2 is the switch whose number was obtained in the translation step 207. Test 212 checks whether the call encounters network congestion. If so, a release message is sent from the point of congestion to switch 1 (action block 214). Note that in case switch 1 itself detects that congestion will be encountered in trying to access switch 2, that the actions beginning with action block 240, described hereinafter, are immediately initiated. If test 212 indicates that the call has not encountered network congestion, test 216 (FIG. 3) checks whether the call encounters an all circuits busy condition at the destination PBX 30. If so, then a release message is sent to switch 1 from egress switch 2 (action block 214, FIG. 2). If the result of test 216 (FIG. 3) is negative then PBX 30 tests whether it wants to reject the call. Outright call rejection as opposed to redirection might be requested if the PBX is overloaded, if the call is low priority, and if there are indications that alternate PBX's are also overloaded. If so, then the PBX sends a reject message to switch 2 (action block 220) and switch 2 generates a release message with reason indicator 62 set to reject (action block 221) and sends this message to switch 1 (action block 214). If the result of test 218 is negative, then test 222 is used to test whether the PBX wants to redirect the call. This may occur because too many calls are in the queue for the number of active agents; the incoming queue has no more space; there has been an unexpected work stoppage; or only priority type calls, such as calls to place orders, can be accepted at this PBX. If the PBX wants to redirect the call, then the PBX sends a redirect indication to switch 2 (action block 224) and switch 2 converts the redirect indication into a release message (action block 226), in this case, with the reason indicator 62 being marked redirect. The release message is then sent to switch 1 (action block 214, FIG. 2). If the PBX does not want to redirect the call, then the PBX will accept the call and the call is completed (action block 228, FIG. 3).

In accordance with one aspect of the invention, the call control message from a destination such as the PBX, comprises an identification of a preferred alternate destination. The ingress switch is responsive to such a release message indicating that the call cannot be completed to the one of the destinations and supplying an alternate destination for rerouting the call to the alternate destination.

Following the sending of a release message to switch 1 (action block 214, FIG. 2), described above, switch 1 receives the release message (action block 230). Switch 1 then performs test 232 to determine whether or not the release message is for a redirectable call. In applicants' specific embodiment, the same type of release message is used for simple release in case of busy as for a requested redirection; this has reduced the development effort required to implement applicants' invention. Other reasons why the release message might not be for a redirectable call are that the customer has not subscribed to call redirection service, or that the redirection is only active during certain hours of certain days of the week, or that only calls originating in certain NPA codes should be redirected. If the release message is not for a redirectable call, then the call is released under the control of ingress switch 1 (action block 234). If the release message is for a redirectable call (positive result of test 232) then ingress switch 1 translates from the non-existent switch number associated with this call attempt (in this case 208) to find the redirect alternative non-existent switch number (action block 240). (The redirect alternative non-existent switch number for 208 is 209 as specified in table 44). Ingress switch 1 then uses the new non-existent switch number to access table 46 using the same TTT number (000) originally provided by database 4 to obtain the identification of an egress switch for the alternative destination PBX. In this case, table 46 indicates that the egress switch number corresponding to SSS-TTT=209-000 is switch 3, the switch connected to PBX 39 which is the alternative destination PBX. Ingress switch 1 then sends an IAM message with destination 209-000-1234 routing the call to switch 3 identified in action block 242 (action block 244). Thereafter, the same actions previously described for blocks 212 starting with block 212 are performed except in this case switch 3 will send the release message to switch 1.

The basic principles discussed above can be used to redirect a call more than once if the first redirected to destination is also unavailable.

While in this specific embodiment, the database supplies only an initial translation and the subsequent translations are made in the ingress switch, it is also possible to perform all the translations in the database by providing a list of alternative destinations to ingress switch 1 at the time of the first access or to request the alternative destinations in a series of subsequent queries. The advantage of providing these translations from the database is that only one database need be updated as customers for whom redirect capabilities are added or as customers change their redirection requests.

Alternatively, the PBX could provide the redirection number as part of the message and thus retain control of the redirection process.

In other arrangements for other types of calls, the routing data can be directly stored in ingress switch 1, thus avoiding the necessity for accessing remote database 4. For example, for a particularly important destination, such as a government bureau, for added security, the alternative destinations may be stored directly in ingress switch 1, Also for destinations serving very high volume traffic, it is desirable to avoid the extra per call database access by storing the routing data in ingress switch 1.

The call may originally be routed to a local exchange controlled Centrex which is programmed to give the same kinds of response messages discussed above for a program controlled PBX.

It is to be understood that the above description is only of one preferred embodiment of the invention. Numerous other arrangements may be devised by one skilled in the art without departing from the spirit and scope of the invention. The invention is thus limited only as defined in the accompanying claims.

We claim:

1. A method for routing a call through a public switched network, comprising a plurality of switching systems interconnected in said network, to one of a plurality of destinations, containing:

responsive to receiving said call in an ingress switching system of said public switched network, querying a data base shared by a plurality of switching systems of said network to obtain a routing indication;

responsive to receiving a routing indication from said data base, extending said call via another switching system of said network and via an egress switching system of said network toward one of said destinations;

after extending said call to said another switching system and in the absence of receipt of an answer indication on said call, determining in said another switching system whether said call can be further extended toward said one destination;

responsive to a determination that said call can be so extended, further extending said call toward said one destination;

responsive to a determination that said call cannot be so extended, generating and transmitting from said another switching system to said ingress switching system a message comprising an indicating that said call cannot be completed to said one destination; and responsive to receiving said message in said ingress switching system, accessing, in said ingress switching system, alternative routing data related to said routing indication for extending said call from said ingress switching system toward another of said destinations.

2. The method of claim 1 wherein said one destination is accessed from one egress switching system of said network and another of said destinations is accessed from another egress switching system of said network and wherein said accessing alternative routing data for extending comprises the step of:

responsive to receiving said message in said ingress switching system, extending said call from said ingress switching via said another egress switching system of said network, said another egress system specified by said alternative routing data.

3. The method of claim 1 wherein said another switching system in said egress switching system of said network, and wherein said determining comprises determining if a network congestion or outage state exists whereby said call cannot be extended toward said egress switching system.

4. The method of claim 1 wherein said determining comprises determining if facilities connecting said one destination to said network are busy or out of service.

5. The method of claim 1 wherein said determining comprises the step of determining that said call cannot be further extended in case of a failure of an egress switching system of said network, said egress switching system for accessing said one destination.

6. The method of claim 1 wherein said routing indication comprises data from which identification of at least one redirect route can be derived in said ingress switching system.

7. The method of claim 1 wherein the accessing step comprises the step of detecting that a called customer of said call subscribes to automatic call redirection service.

8. The method of claim 1 wherein the accessing step is performed selectively in response to certain values of said message and is not performed for other values of said message.

9. The method of claim 1 wherein said determining comprises the step of generating and transmitting a call release message from said one destination wherein said one destination is a program controlled PBX.

10. The method of claim 9 wherein said step of generating a call release message comprises the step of generating a call release message with a particular cause value identifying a cause for redirection of the call.

11. The method of claim 10 wherein said cause value is destination subscriber busy.

12. The method of claim 10 wherein said cause value is no agents available at said PBX to handle the call in a timely manner.

13. The method of claim 10 wherein said cause value is destination PBX switching system congestion.

14. The method of claim 10 wherein said cause value is no destination subscriber response.

15. The method of claim 10 wherein the second extending step is adjusted responsive to a cause value supplied in said call release message and received in said ingress switching system.

16. The method of claim 9 wherein said generating and transmitting a call release message comprise transmitting said call release message over an integrated voice/data facility to a connected egress switching system of said network.

17. The method of claim 16 wherein said integrated data/voice facility is an ISDN facility.

18. The method of claim 1 wherein said determining if all routes through a local exchange network, for accessing a switching system connected to said one destination, are busy or out of service.

19. The method of claim 1 wherein said one destination is part of a Centrex controlled by a local switching system and wherein said generating and transmitting comprise generating a call release message from said local switching system, said call release message comprising data specifying a cause value identifying a cause for redirection of the call.

20. In an interexchange carrier network comprising a plurality of switching systems, apparatus for routing a call to one of a plurality of destinations, comprising:

an ingress switching system comprising processor means responsive, under program control, to an incoming call destined for said destination for querying a data base shared by a plurality of said switching systems of said network to obtain a routing indication from a database means for said call;

said processor means responsive, under program control, to receipt of said routing indication for extending said call through another switching system of said network toward said one destination via a first of two egress switching systems of said network connected to said destination; and said processor means further responsive, under program control, and in the absence of receipt of an answer indication for said call, to a data message comprising an indication, received from said another switching system, that said call cannot be completed to said destination via said first egress switching system, for accessing, in said ingress switching system, alternative routing data related to said routing indication for extending said call toward said one destination via the second of said two egress switching systems.

21. The method of claim 1 wherein said routing indication provides data for accessing in said ingress switching system, routing data, including said alternative routing data, for extending a call toward an alternate destination.

22. The method of claim 1 wherein said public switched network is an interexchange carrier network.

* * * * *

UNITED STATES PATENT AND TRADEMARK OFFICE
CERTIFICATE OF CORRECTION

PATENT NO. : 5,253,288

DATED : October 12, 1993

INVENTOR(S) : Alan E. Frey, Joshua H. Rosenbluth, Susan J. Sobel

It is certified that error appears in the above-identified patent and that said Letters Patent is hereby corrected as shown below:

Claim 3, column 8, line 51, delete "in" and substitute --is--.

Claim 18, column 9, line 38, after "determining" insert --comprises determining--.

Signed and Sealed this

Fifth Day of December, 1995

Attest:

BRUCE LEHMAN

Attesting Officer

Commissioner of Patents and Trademarks